April 21, 1970     C. M. ALLABEN, JR     3,507,374

ELECTROMAGNETIC CLUTCH ACTUATOR

Filed Oct. 26, 1966        6 Sheets-Sheet 1

INVENTOR
CHARLES M. ALLABEN JR.
BY Evan D. Roberts
ATTORNEY

April 21, 1970 C. M. ALLABEN, JR 3,507,374
ELECTROMAGNETIC CLUTCH ACTUATOR
Filed Oct. 26, 1966 6 Sheets-Sheet 3

INVENTOR
CHARLES M. ALLABEN JR.
BY Evan D. Roberts
ATTORNEY

April 21, 1970 C. M. ALLABEN, JR 3,507,374
ELECTROMAGNETIC CLUTCH ACTUATOR
Filed Oct. 26, 1966 6 Sheets-Sheet 6

INVENTOR
CHARLES M. ALLABEN JR.
BY Evan D. Roberts
ATTORNEY

United States Patent Office 3,507,374
Patented Apr. 21, 1970

3,507,374
ELECTROMAGNETIC CLUTCH ACTUATOR
Charles M. Allaben, Jr., Ithaca, N.Y., assignor, by mesne assignments to Borg-Warner Corporation, Chicago, Ill., a corporation of Delaware
Filed Oct. 26, 1966, Ser. No. 589,597
Int. Cl. F16d 27/10
U.S. Cl. 192—84                                                                                              11 Claims

ABSTRACT OF THE DISCLOSURE

A clutch of the disc pack type in which engagement is initiated electrically and in which the initiating force is multiplied by an intermediate force-amplifying device.

---

This invention relates to clutches and more particularly to a clutch of the disc pack type in which the engaging force is initiated electrically and in which this force is multiplied by an intermediate force-amplifying device for compression of the disc pack.

In prior art clutches of this type the electrical device commonly took the form of an electromagnetic pilot clutch having an electromagnetic coil operating on direct current; a pole assembly comprising an inner pole piece and an outer pole piece and an armature movable upon energization of the coil to engage the pole pieces. All of these parts are made of specially selected material utilized by reason of its ability to carry a magnetic flux at high density. The electromagnetic clutch required specially designed non-magnetic materials for mounting, positioning and maintaining the essential parts in proper relation to transmit magnetic flux. When the coil is energized by direct current, a magnetic field is created which tends to draw the armature toward the pole pieces. As the clutch is engaged, sliding friction occurs at both the armature and the pole assembly with consequent abrasion and wear. This wear at the interface between the armature and the pole assembly tends to limit the life of the clutch.

A principal object of the invention is to provide a clutch of the disc pack type having means for operating a force-amplifying mechanism, independent of both the speed and direction of relative rotation between the output shaft and the input shaft.

Another object of the invention is to provide a clutch of the disc pack type in which the pilot actuator is capable of operating a force-amplifying mechanism without relying on friction.

Another object of the invention is to produce a clutch of the stated type wherein all of the torque transmitted by the pilot clutch is transmitted to the force-amplifying mechanism for effective compression of the disc pack.

A further object of the invention is to provide a clutch of the mentioned character, wherein the pilot clutch is capable of operating on alternating current, thus eliminating the need for a special direct current power supply.

Another object of the invention is to provide a clutch of the disc pack type having a force-amplifying mechanism and a pilot clutch for initiating the operation of the force-amplifying mechanism wherein relatively large torque levels may be transmitted and wherein the diameter of the clutch is relatively limited.

These and other objects will become more apparent as the description proceeds with respect to the accompanying drawings, wherein.

Figure 1:
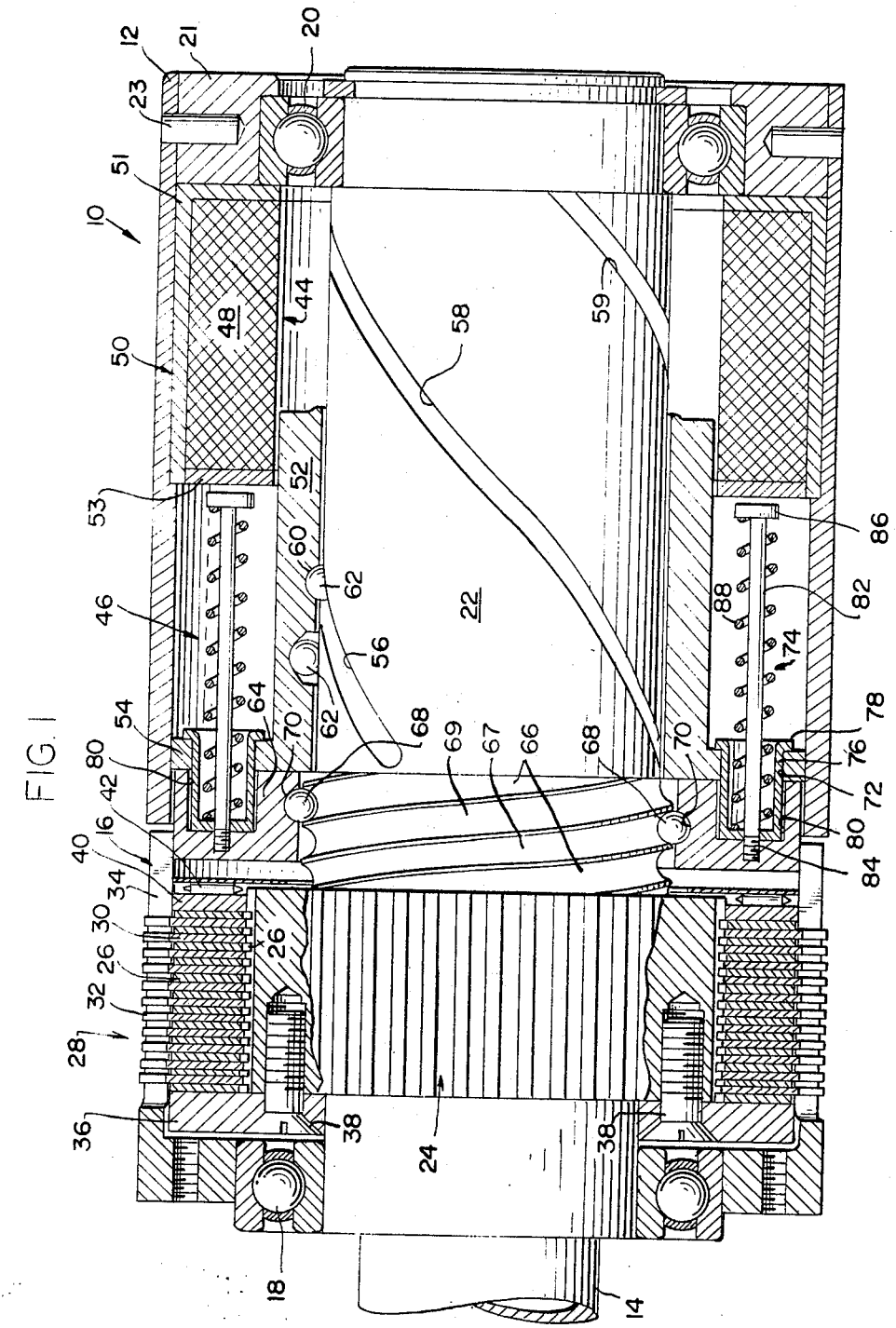
FIGURE 1 is a vertical sectional view of a clutch made in accordance with the present invention with the operative elements in disengaged condition.
Figure 2:
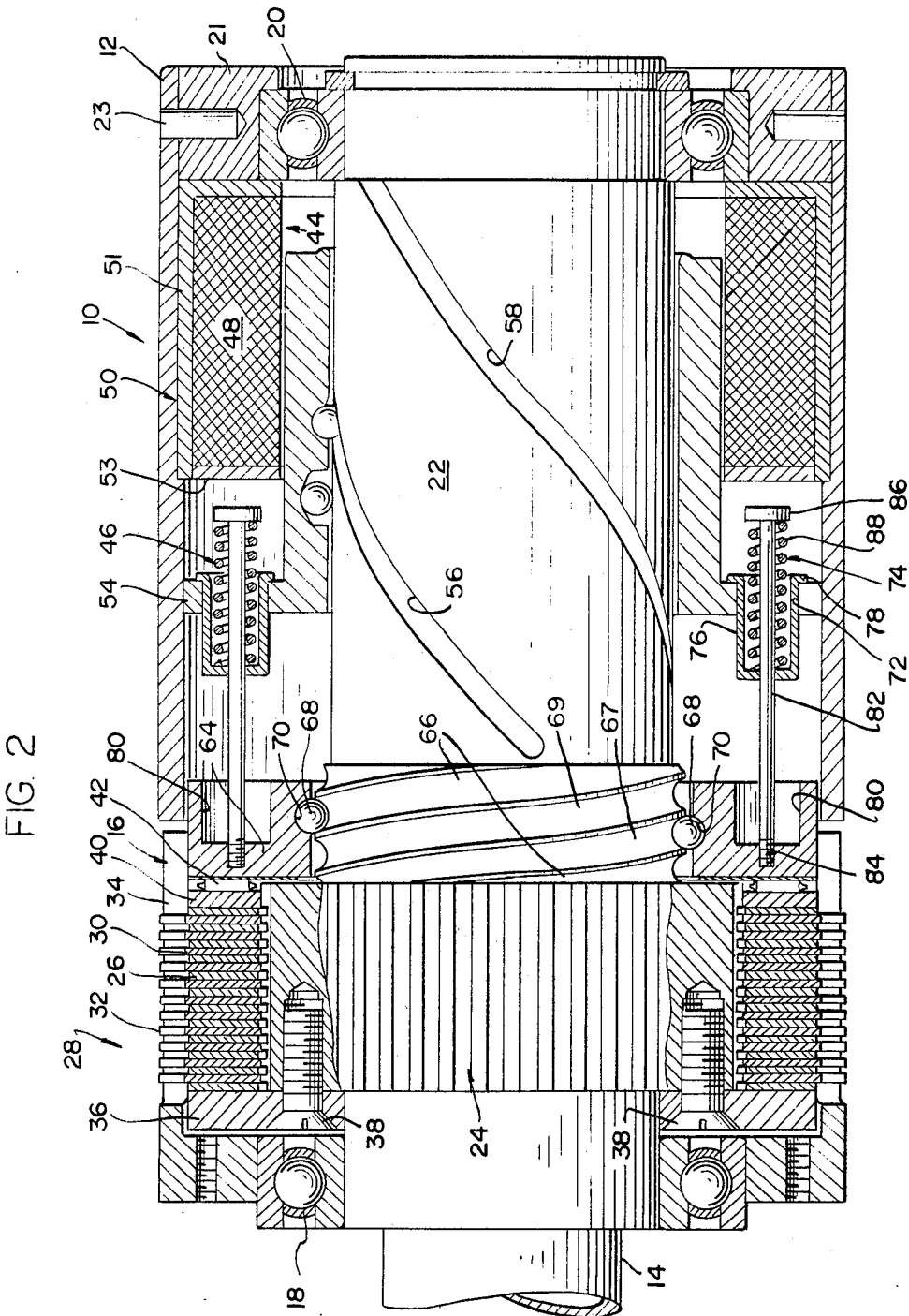
FIGURE 2 is a view similar to FIGURE 1 but showing the clutch in engaged condition.

Referring now to the drawings, and more particularly to FIGURES 1 and 2, the clutch of the present invention is indicated generally by reference numeral 10 and includes a housing 12, desirably of non-magnetic material, an input member in the form of a shaft 14 and an output member 16 supported by a ball bearing 18. Extending through the housing 12, and journalled in the ball bearing 18 and the ball bearing 20 is an elongated hub 22 which is drivingly connected to the input shaft 14. Interposed between the bearing 20 and the housing 12 is a mounting ring 21 secured to the housing 12 by means of circumferentially spaced pins 23, desirably non-magnetic.

The hub 22 is formed with a section 24 of greater diameter having a splined periphery for meshing reception of internally splined annular driving discs 26 of a disc pack assembly indicated generally by reference numeral 28. The disc pack assembly 28 further includes a plurality of annular driver discs 30, interleaved with the discs 26, each having at the outer periphery thereof a plurality of circumferentially spaced lugs 32 each of which is received in a slot 34 in the output member 16. The assembly 28 further includes a thrust plate 36 secured to the section 24 by, for example, circumferentially spaced cap screws 38, a pressure race 40 and a thrust bearing 42.

Engagement of the disc pack assembly 28 may be afforded by energization of a solenoid pilot clutch assembly 44 which acts upon a force-multiplying mechanism 46 to compress the discs 26 and 30 and thus effect frictional engagement sufficient to provide relatively great drive torque to the driven member 16.

FIGURE 1 illustrates the disengaged position of the clutch of the present invention. In this position the disc pack assembly 28 is uncompressed and very little drive torque is imparted by the discs 26 to the discs 30. Upon energization of the solenoid assembly 44, in a manner hereinafter described, sufficient axial force is exerted on the disc pack assembly 28 to effect engagement thereof.

The solenoid assembly 44 includes an annular coil 48 surrounded by an annular shroud 50 of magnetic material and having a section 51 of L cross-section and a flat washer 53. The inner periphery of the coil 48 is disposed in spaced relation to the outer periphery of the hub 22 and within this space is received a sleeve-shaped plunger 52 having at the left end thereof, as viewed in FIGURES 1 and 2, a radially outwardly extending flange 54. The right side of the hub 22, as viewed in FIGURES 1 and 2, is formed with at least three helical grooves 56, 58 and 59. In like manner, the inner periphery of the plunger 52 is formed with a plurality of grooves 60. A plurality of balls 62 are received in rolling relation in the cooperating grooves of the plunger 52 and the hub 22 so that upon movement of the plunger 52 from the disengaged position illustrated in FIGURE 1 to the engaged position of FIGURE 2 upon energization of the coil 48, the plunger 52 is rotated in a clockwise direction, as viewed from the right in these figures.

According to an important feature of the present invention the force-amplifying mechanism 46 includes a nut 64 which maintains a constant angular relation with the flange 54 so that rotation of the plunger 52 effects rotation of the nut 64 in the same direction. The details of this arrangement are described in detail hereinafter. This rotative force is amplified by grooves 66 and 67 in which are received in rolling relation balls 68. The balls 68 are illustrated as being received in grooves 70 at the inner periphery of the nut 64.

As the nut 64 is rotated (clockwise as viewed from the right hand end of the clutch) relative to the hub 22, the nut is caused, by the balls 68 and the grooves 66, 67 and 69, in which they are seated, to move axially to the left until the clearance is taken up, after which the nut 64 presses, as torque is applied to it, against the thrust bearing 42 which, in turn, presses against the pressure race 40 which presses against the disc stack. A relatively low torque applied to the nut will produce a large axial force against the disc stack by virtue of the mechanical advantage offered by the ball screw assembly.

It will be noted that the lead of the grooves 66 is much smaller than the lead of the grooves 56 and 58, and that the axial motion of the nut 64 is much smaller than the axial motion of the plunger 52. The path through which the plunger 52 moves axially is limited to a helix of the same lead and helix angle as those of the grooves 56, 58 and 59. As the plunger 52 moves axially in response to energization of the coil 48 it is also forced to rotate about the hub 22. In the form of the invention illustrated the helix angle is 45°; therefore, neglecting friction, there is a force acting perpendicularly to the axis of the hub 22 and tangent to the pitch circle of the helix tending to rotate the pitch circle about the hub 22. This force is equal in magnitude to the force tending to move the plunger 52 axially along the hub 22. For the same reason, the force exerted to compress the disc pack is much greater than the force with which the plunger 52 is moved to the right into the coil 48. In the embodiment shown, this ratio is 8:1—i.e., an axial force of 250 pounds exerted on the plunger 52 by the field created by the coil 48 will result in the nut exerting a force of 2,000 pounds against the disc pack. In this example, an axial movement of the nut 64 of ⅛″ requires the plunger 52 to move a full inch. In the form of the invention illustrated in FIGURES 1 and 2, an extra 1/16″ of travel has been allowed to take care of wear in the disc pack. For this reason, the plunger 52 is permitted to move further to the right approximately ½″ as wear occurs.

As stated previously, a fixed angular relation between the flange 54 and the nut 64 is maintained. Of course, the flange 54 is free to move axially from the position illustrated in FIGURE 1 to the position illustrated in FIGURE 2 upon energization of the coil 48. In FIGURES 1 and 2 are illustrated a plurality of return assemblies for the plunger 52. These return assemblies return the plunger 52 from the position illustrated in FIGURE 2 to the position illustrated in FIGURE 1. The flange 54 is provided with a plurality of circumferentially spaced openings 72 in each of which is received one of the return units 74. Each of the units 74 includes a cup 76 having a radially outwardly extending flange 78 extending into overlying relation to the right surface of the flange 54, as viewed in FIGURES 1 and 2. The nut 64 is formed with a plurality of cylindrical recesses 80, one for each of the return units 74. Each unit 74 also includes an elongated stud or guide rod 82 threadedly received at one end in an opening 84 in the base of each recess 80 and having at the other end thereof a disc-shaped head 86. A helical compression spring 88 extends between the cup 76 and the head 86 so that the plunger 52 is normally biased to the left, to the position illustrated in FIGURE 1. When the coil 48 is energized, the spring 88 is compressed, as illustrated in FIGURE 2, and exerts a force to return the plunger 52 when the coil 48 is deenergized.

Figure 3:
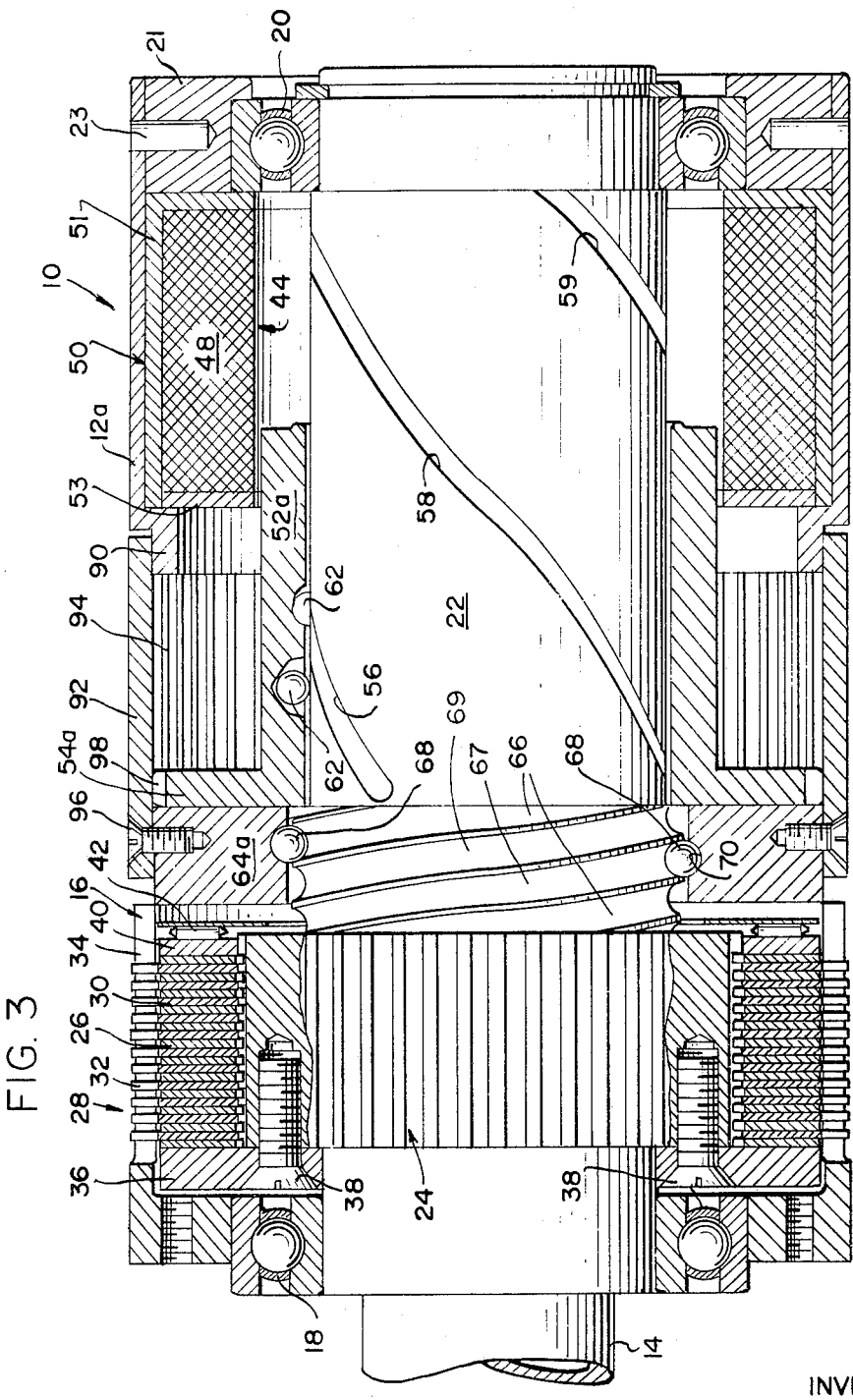
FIGURE 3 is a vertical sectional view of a clutch made in accordance with a modified form of the invention, the clutch being illustrated as being disengaged.
Figure 4:
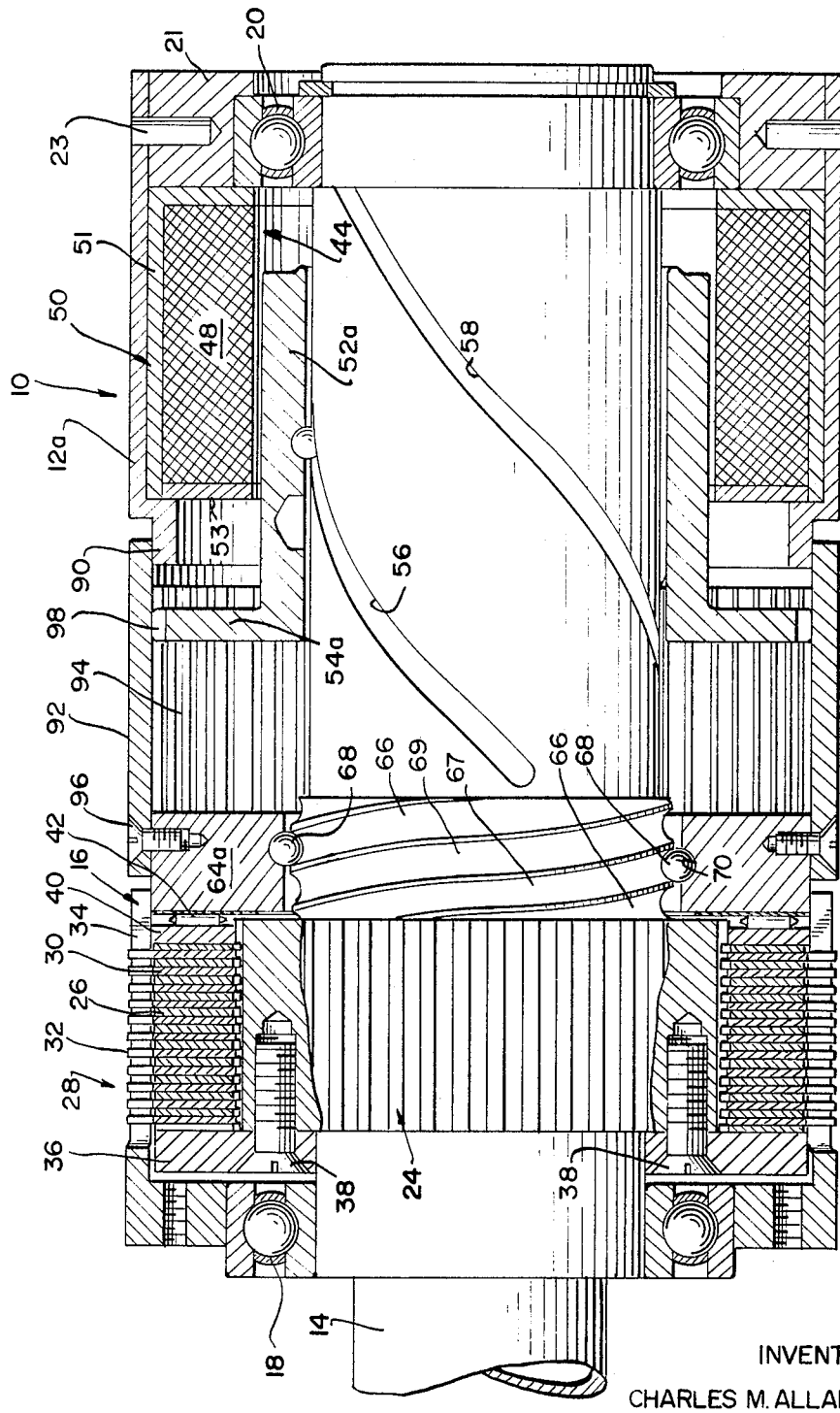
FIGURE 4 is a view similar to FIGURE 3 but showing the clutch of a modified form of the invention in engaged condition.

In FIGURE 3 is illustrated a modified form of the present invention in which like parts are denoted by like reference numerals. This form of the invention is similar in all respects to that illustrated in FIGURES 1 and 2, but has a different arrangement for ensuring a fixed angular relation between the plunger and the nut. In this modified form of the invention a housing 12a is formed with a portion 90 of a reduced diameter forming a ledge on which rides a ring 92 having internal splines 94 and secured, by circumferentially spaced screws 96, to nut 64a. The outer periphery of flange 54a is formed with splines 98 slidingly in mesh with the splines 94. The plunger 52a is free to move axially along the length of the splines 94 but cannot move angularly with respect to the nut 64a. In FIGURE 4 is illustrated the clutch of the form of the invention illustrated in FIGURE 3 in the engaged position. Suitable spring means, as for example, shown in FIGURES 1 and 2, may be employed to return the plunger 52a from the position illustrated in FIGURE 4 to the position illustrated in FIGURE 3.

Figure 5:
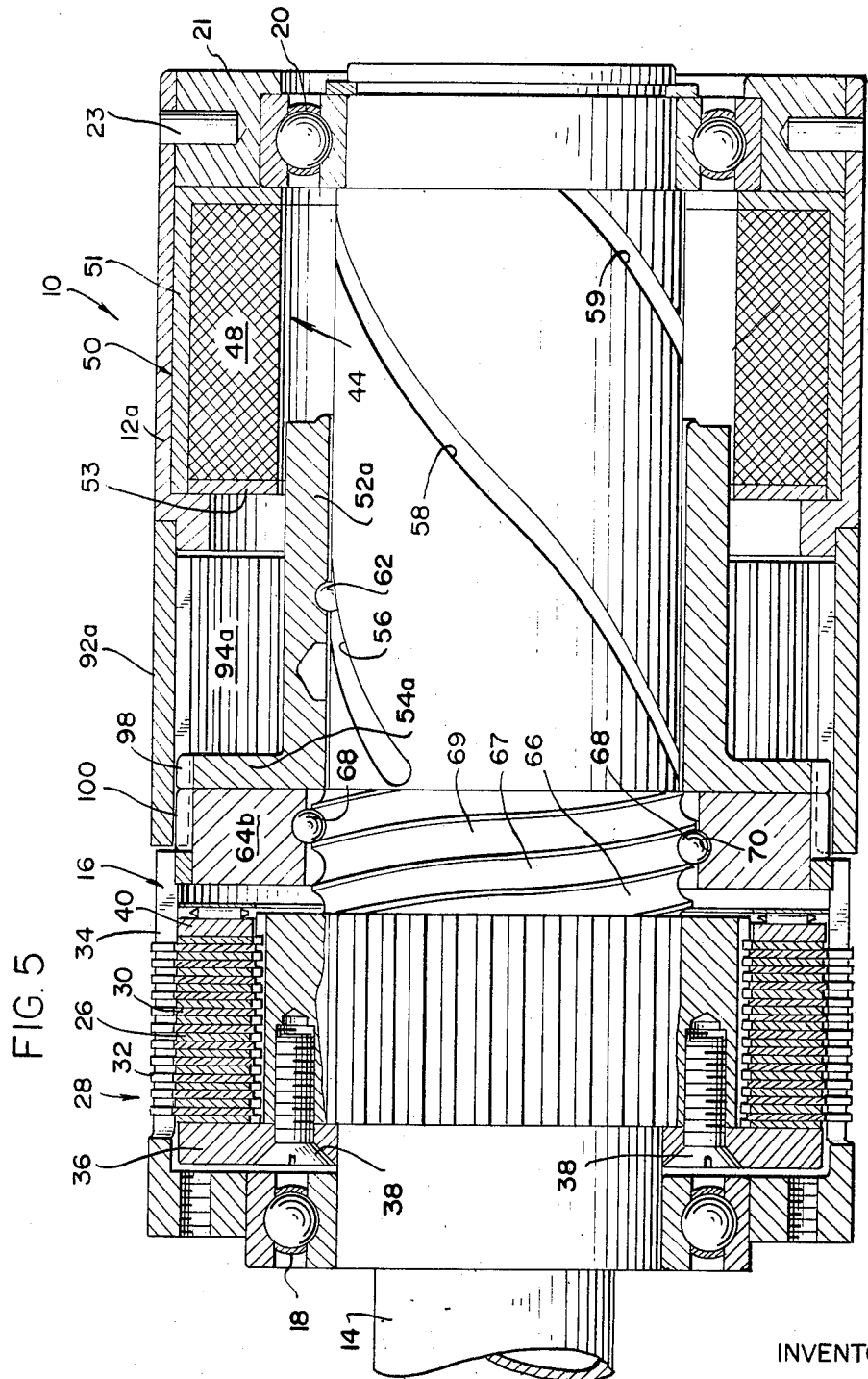
FIGURE 5 is a vertical sectional view of a clutch made in accordance with a further modified form of the present invention, the clutch being illustrated as being disengaged.
Figure 6:
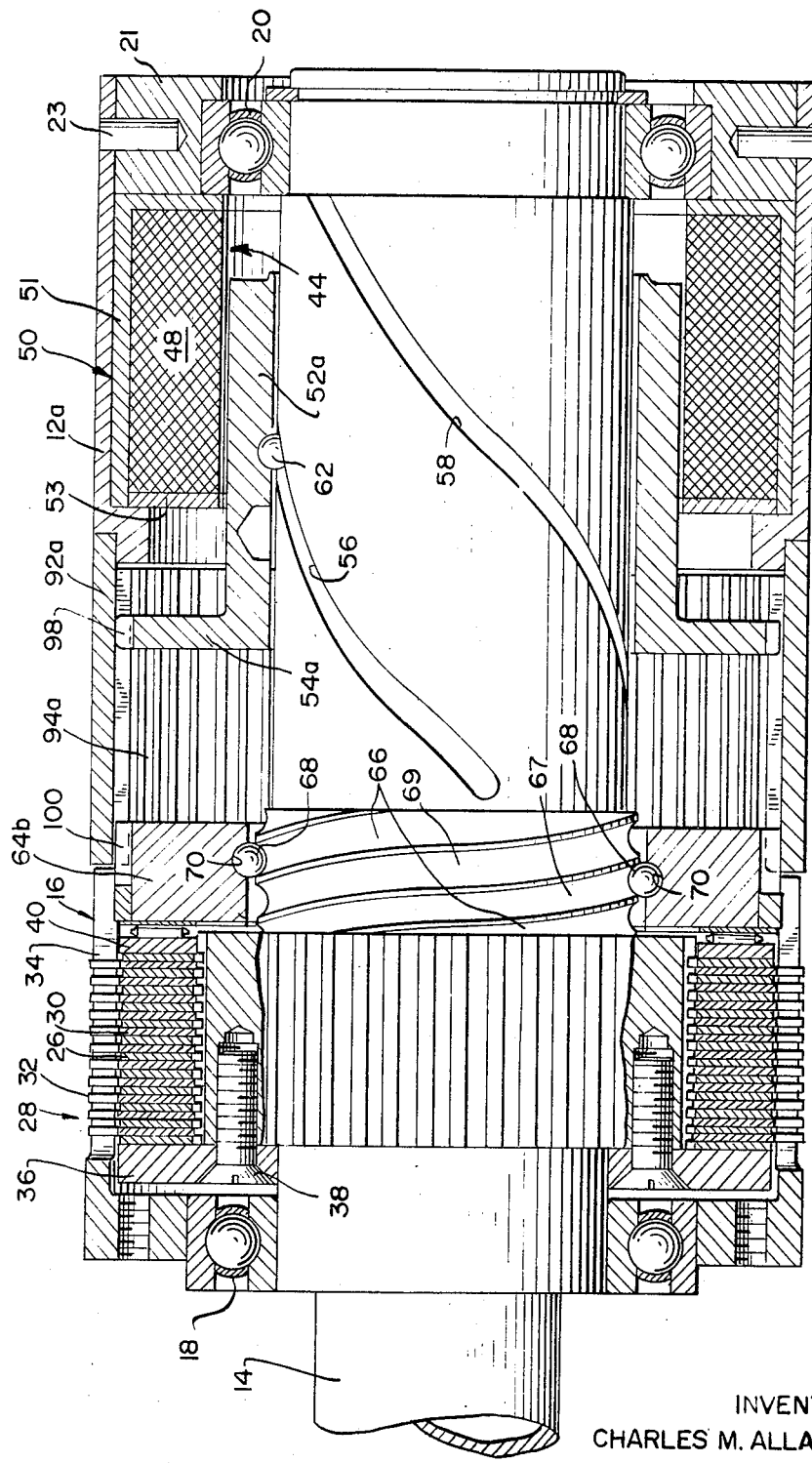
FIGURE 6 is a view similar to FIGURE 5 but illustrating the clutch in engaged condition.

In FIGURES 5 and 6 is illustrated a further modified form of the present invention which is similar to that disclosed in FIGURES 3 and 4 but has a modified arrangement for assuring the affixed angular relation of the plunger and the nut. In this form of the invention a ring 92a is formed with internal splines 94a extending substantially to the left edge thereof and meshing with splines 100 on the outer periphery of nuts 64b.

The clutch of the above-described invention exhibits important advantages over clutches of this type heretofore known. For instance, sliding friction is not employed to transmit torque from the solenoid assembly to the force-amplifying mechanism, since it is subject only to rolling friction, is in excess of 95%. All of the torque produced by rotation of the plunger 52 is delivered to the force-amplifying mechanism. Rotation of the plunger and the nut occurs independently of the speed of either the input member or the output member; and the clutch can therefore, be engaged when neither the input member nor the output member is rotating. Furthermore, the rotation of the plunger and nut relative to the hub is independent of the direction of rotation of either the input member or the output member of the clutch. This being so, the direction of rotation of the clutch can be reversed without disengaging the clutch, even momentarily. Another advantage is that a separate direct current supply is not required.

Applicant does not intend to be limited by the above disclosure but rather by the scope of the appended claims.

I claim:

1. A clutch comprising a housing, an input member, an output member, an elongated hub connected to said input member, a disc pack assembly mounted in surrounding relation to said hub, said disc pack assembly including a plurality of annular driving discs splined to said hub and a plurality of driven discs interleaved with said driving discs and meshed with said driven member, a solenoid assembly mounted in said housing in surrounding relation to said hub, said solenoid assembly including an annular coil and an annular plunger received in said coil and movable axially with respect to said hub upon energization of said coil, force-amplifying means interposed between said solenoid assembly and said disc pack assembly, said plunger having a radially outwardly extending flange and being provided at the inner periphery thereof with a plurality of helical grooves, said hub being provided with a plurality of helical grooves for reception of a plurality of balls in cooperation with the grooves of said plunger whereby said plunger is rotated with respect to said hub as axial movement occurs in response to energization of said coil, said force-amplifying means including a plurality of grooves formed on the outer periphery of said hub, a nut surrounding said hub and having a plurality of grooves at the inner periphery thereof and a plurality of balls received in said nut grooves and said last-named hub grooves, said nut being provided with a plurality of circumferentially spaced axially extending studs each received in one of the apertures of said plunger flange, whereby rotation of said plunger effects rotation of said nut and consequent axial movement of said nut to engage said disc pack assembly.

2. A clutch in accordance with claim 1 wherein means are provided for returning said force-amplifying means to neutral position.

3. A clutch comprising a housing, an input member, an output member, an elongated hub connected to said input member, a disc pack assembly mounted in surrounding relation to said hub, said disc pack assembly including a plurality of annular driving discs splined to said hub and a plurality of driven discs interleaved with said driving discs and meshed with said driven member, a solenoid assembly mounted in said housing in surrounding relation to said hub, said solenoid assembly including an annular coil and an annular plunger received in said coil and movable axially with respect to said hub upon energization of said coil, force-amplifying means interposed between said solenoid assembly and said disc pack assembly, said plunger having a radially outwardly extending flange and being provided at the inner periphery thereof with a plurality of helical grooves, said hub being provided with a plurality of helical grooves for reception of a plurality of balls in cooperation with the grooves of said plunger whereby said plunger is rotated with respect to said hub as axial movement occurs in response to energization of said coil, said force-amplifying means including a plurality of grooves formed on the outer periphery of said hub, a nut surrounding said hub and having a plurality of grooves at the inner periphery thereof and a plurality of balls received in said nut grooves and said last-named hub grooves and means for maintaining a fixed angular relation between said plunger flange and said nut.

4. A clutch in accordance with claim 3 wherein said last-named means includes an internally splined sleeve fixed to said nut for rotation therewith and meshing splines on the periphery of said plunger flange.

5. A clutch comprising a housing, an input member, an output member, an elongated hub connected to said input member, a disc pack assembly mounted in surrounding relation to said hub, said disc pack assembly including a plurality of annular driving discs splined to said hub and a plurality of driven discs interleaved with said driving discs and meshed with said driven member, a solenoid assembly mounted in said housing in surrounding relation to said hub, said solenoid assembly including an annular coil and an annular plunger received in said coil and movable axially with respect to said hub upon energization of said coil, force-amplifying means interposed between said solenoid assembly and said disc pack assembly, said force-amplifying means having screw means including a nut surrounding said hub, said plunger having a radially outwardly extending flange having a plurality of circumferentially spaced apertures, a second screw means for rotating said plunger as it moves axially, and means for maintaining a fixed angular relation between said nut and said plunger flange.

6. A clutch comprising a housing, an input member, an output member, a compressible disc pack for selectively drivingly connecting said input member and said output member, a force-amplifying mechanism mounted in said housing, said force-amplifying mechanism comprising a cylindrical actuating member, a sleeve surrounding said actuating member, a solenoid surrounding said actuating member in spaced relation thereto, said sleeve being receivable in the annular space between the actuator member and said solenoid and forming the core of said solenoid, said solenoid being operable upon energization to move said sleeve axially with respect to said actuating member, said actuating member having at the periphery thereof a helical groove, a plurality of balls received in said groove, said sleeve having at the inner periphery thereof a plurality of recesses for reception of said balls, said actuating member being formed at one end thereof with a plurality of threads, a nut threadedly received on said end of said hub whereby said nut is moved to compress said disc pack upon energization of said solenoid coil.

7. A clutch comprising a housing, an input member, an output member, an elongated hub connected to said input member, a disc pack assembly mounted in surrounding relation to said hub, said disc pack assembly including a plurality of annular driving discs splined to said hub and a plurality of driven discs interleaved with said driving discs and meshed with said driven member, a solenoid assembly mounted in said housing in surrounding relation to said hub, said solenoid assembly including an annular coil and an annular plunger received in said coil and movable axially with respect to said hub upon energization of said coil, force-amplifying means interposed between said solenoid assembly and disc pack assembly, said plunger having a radially outwardly extending flange and being provided at the inner periphery thereof with a plurality of helical grooves, said hub being provided with a plurality of helical grooves for reception of a plurality of balls in cooperation with the grooves of said plunger whereby said plunger is rotated with respect to said hub as axial movement occurs in response to energization of said coil, said force-amplifying means including a plurality of grooves formed on the outer periphery of said hub, a nut surrounding said hub and having a plurality of grooves at the inner periphery thereof and a plurality of balls received in said nut grooves and said last-named hub grooves, means for maintaining a fixed angular relation between said plunger flange and said nut and said last-named means including a sleeve fixed to said nut and having internal splines in mesh with corresponding splines on the outer periphery of said flange.

8. A clutch in accordance with claim 7, wherein said sleeve is affixed to said nut by a plurality of circumferentially spaced screws.

9. A clutch in accordance with claim 7, wherein said nut is formed with external splines in mesh with the splines of said sleeve.

10. A clutch comprising a housing, an input member, an output member, an elongated hub connected to said input member, a disc pack assembly mounted in surrounding relation to said hub, said disc pack assembly including a plurality of annular driving discs splined to said hub and a plurality of driven discs interleaved with said driving discs and meshed with said driven member, a solenoid assembly mounted in said housing in surrounding relation to said hub, said solenoid assembly including an annular coil and an annular plunger received in said coil and movable axially with respect to said hub upon energization of said coil, force-amplifying means interposed between said solenoid assembly and said disc pack assembly, said plunger having a radially outwardly extending flange and being provided at the inner periphery thereof with a plurality of helical grooves, said hub being provided with a plurality of helical grooves for reception of a plurality of balls in cooperation with the grooves of said plunger whereby said plunger is rotated with respect to said hub as axial movement occurs in response to energization of said coil, said force-amplifying means including a plurality of grooves formed on the outer periphery of said hub, a nut surrounding said hub having a plurality of grooves at the inner periphery thereof and a plurality of balls received in said nut grooves and said last-named hub grooves, said nut being provided with a plurality of circumferentially spaced axially extending studs each received in one of the apertures of said plunger flange, whereby rotation of said plunger effects rotation of said nut and consequent axial movement of said nut to engage said disc pack assembly, and spring means for returning said force-amplifying means and said plunger to neutral position.

11. A clutch in accordance with claim 10, wherein said flange is formed with a plurality of circumferentially spaced apertures and wherein said spring means comprises a plurality of spring units one for each aperture, each of said spring units comprising a flanged cup received in an aperture, an elongated stud threadedly received at one end in said nut and having at the other end a disc-shaped head, said cup having a central opening for said stud, and a compression spring disposed between the bottom of said cup and said head.

References Cited

UNITED STATES PATENTS

| | | | |
|---|---|---|---|
| 1,217,569 | 2/1917 | Cooper | 192—94 |
| 2,130,855 | 9/1938 | Oliver | 192—84 XR |
| 2,555,215 | 5/1951 | Warner | 192—35 |
| 2,933,171 | 4/1960 | Kraeplin | 192—35 |
| 3,235,045 | 2/1966 | Pop | 192—94 |

MARTIN P. SCHWADRON, Primary Examiner

L. J. PAYNE, Assistant Examiner

U.S. Cl. X.R.

192—94, 97